United States Patent Office 3,246,002
Patented Apr. 12, 1966

3,246,002
WERNER CHROME COMPLEX COMPOUNDS OF LEVULINIC HYDANTOIN AND CONDENSATION PRODUCTS THEREOF
Domenick Donald Gagliardi, East Greenwich, and Vincent Theodore Elkind, North Kingstown, R.I., assignors to Argus Chemical Corporation
No Drawing. Filed Nov. 14, 1961, Ser. No. 152,163
4 Claims. (Cl. 260—299)

This invention relates to the preparation of the Werner chrome complexes of levulinic acid hydantoin (LH) and to condensation products thereof. In the following, the hydantoin of levulinic acid will be called LH for short.

Condensation products of formaldehyde with LH were disclosed in U.S. Patent No. 2,955,057 to Gagliardi and Jutras. The prepartion of Werner chrome complexes of several fatty acids was first disclosed in U.S. Patent No. 2,273,040.

The Werner chrome complexes described in that and in other patents have useful properties in waterproofing paper and textiles, shrinkproofing textiles, pretreating glass fiber, and similar applications.

In further investigating Werner chrome complexes, we have found that the LH complexes have a number of properties hitherto unknown. It was also found that the formaldehyde condensation products made from said complexes are very useful materials for tanning of leather, for insolubilizing polyvinyl alcohol, glue, casein, and the like, for the fixing of pigments, and for improving the adhesion of polymers to fibrous surfaces.

The Werner chrome complexes of this invention have the following structure:

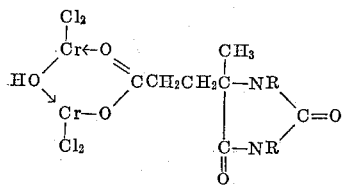

where R stands for H, —CH$_2$OH, —CH$_2$OCH$_3$, —CH$_2$OC$_2$H$_5$, —CH$_2$OC$_3$H$_7$ and CH$_2$OC$_4$H$_9$, and for —C$_n$H$_{2n+1}$; and wherein n represents an integer from 1 to 4.

Especially useful are such applications to fiberglass surfaces to increase the adhesion of laminating resins. We believe that these adhesive applications result from change in the polarity and reactivity of the surface of the substrate, since the LH-chrome complex-aldehyde product orients itself toward the outer surface:

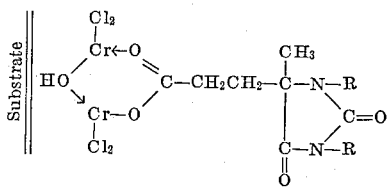

and thereby offers a reactive site for the later coating and laminating with polymeric materials. For example, when R is a methylol group and the coating resin is a amine-aldehyde, epoxy, isocyanate, or phenolformaldehyde resin, then co-reaction takes place thereon leading to durable bonded finishes.

It is the object of this invention to provide novel chrome complex compounds of LH and a process for the preparation of these chrome complex compounds as well as the derivatives illustrated in the above formula.

It is also an object of this invention to provide a process for the preparation of condensation products of the LH complexes so produced.

Other objects and advantages of the invention will become apparent from the detailed description hereinbelow.

The preparation of the chrome complexes of this invention may be carried out before reacting the LH with formaldehyde or after as desired. We may use chromium trichloride, chromyl chloride, and basic chrome chloride to introduce the chrome groups in the carboxyl radical of LH.

The invention will now be more fully described in a number of examples, but is should be understood that these are given by way of illustration and not of limitation.

EXAMPLE 1A

*Preparation of Werner chrome complex of LH in ethanol*

266.5 g. of chromium chloride hexahydrate (CrCl$_3$·6H$_2$O)

were stirred and refluxed a few minutes with 630 g. 95% ethyl alcohol. The green solution was cooled to 28° C. 93 g. of LH were added and the mixture heated to reflux at 78° C. The solution was cooled to 35° C. and 40 g. sodium hydroxide were added. The reaction mixture was stirred rapidly and refluxed for 8 hours. Then, the sodium chloride was filtered off, washed with alcohol, dried and weighed. 61.7 g. of salt was obtained; the theoretical quantity is 58.5 g. The green solution of the product was calculated to contain 22.6% of the Werner chrome complex of LH.

From the solution, the alcohol was distilled off and there remained a green powder which has the formula

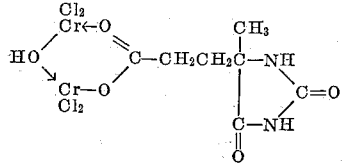

This powder is soluble in methanol, ethanol and hot water.

The green dry powder was analyzed for nitrogen, chlorine and chromium with the following values found:

|  | Mole Equivalents Found by Analysis | Mole Equivalents Calculated |
|---|---|---|
| N | 2.01 | 2.00 |
| Cl | 3.90 | 4.00 |
| Cr | 2.00 | 2.00 |

EXAMPLE 1B

*Preparation of LH chrome complex compound in methanol*

177 g. basic chrome chloride (approx. ⅓ basic and 79% pure) were stirred and refluxed with 470 g. of methanol for 10 minutes. A green solution resulted which was cooled to 60° C., and 93 g. of LH were added. The charge was heated and stirred for 45 minutes at 63° to 64° C. and filtered to remove a trace of insolubles. A 28% solution of the LH chrome complex was prepared by addition of methanol.

The dark green product obtained upon drying was hygroscopic and soluble in methanol, ethanol and hot water.

EXAMPLE 2

*Preparation of bis-(methoxymethyl)derivative of the LH chrome complex in methanol*

159 g. of the reaction product of Example 1B in methanol were stirred at 59°–60.5° C. for 1 hour and 20 minutes with 10.9 g. of Methyl Formcel (55% formaldehyde, 33% methanol and 12% water). The green solution contained 32% solids calculated on the basis of the following formula:

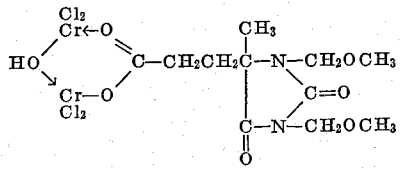

The dried product was brittle, hygroscopic, dark green in color, soluble in water and hot ethanol.

EXAMPLE 3

*Preparation of the bis-(butoxy-methyl)derivative of the LH chrome complex*

44.25 g. of basic chrome chloride were dissolved in 101 g. of normal butyl alcohol with stirring and heating at 90° C. for 25 minutes. 23.25 g. of LH were added; the charge was heated and stirred for 38 minutes at 89°–94° C. The chrome complex of LH thus formed was cooled to 66° C. 18.7 g. of Normal Butyl Formcel were added with no noticeable heat development. The charge was stirred and heated for 1 hour and 45 minutes, filtered to remove a trace of impurity and made up to a 30% solids containing product, the bis-Butyl Formcel derivative of LH chrome complex:

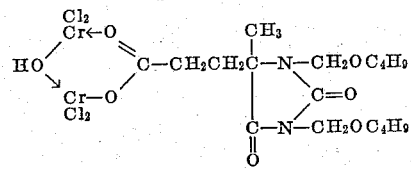

The butanol solution of the chrome complex was miscible with water, carbon tetrachloride and benzene. The dried product was not soluble in carbon tetrachloride or in benzene, but was soluble in hot water and hot ethanol.

EXAMPLE 4

*Preparation of a product of the formula*

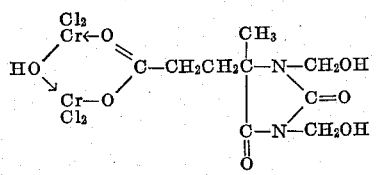

57 g. of dried LH chrome complex were stirred with 100 g. water for 30 minutes at 50° C. until dissolved. 16.2 g. of 37% formaldehyde were charged at 20° C. with no noticeable heat development; then the charge was heated to 50° C. for 1 hour.

The dried product was dark green, hygroscopic, less brittle and more tacky than the other above described chrome complexes. It was soluble in water, but not soluble in hot ethanol.

EXAMPLE 5

*Preparation of a condensation product with urea*

60 g. urea were dispersed in 56 g. methyl alcohol. 120 g. Methyl Formcel (55% $CH_2O$, 33% $CH_3OH$ and 12% water) were adjusted to pH 10.0 with a 10% solution of NaOH in methanol. The reactants were refluxed for 1 hour.

The dimethylolurea was cooled to room temperature and to it was added the sodium salt of LH in methanol, prepared from 93 g. of LH and 20 g. NaOH in 118 g. methanol; pH 10.3. 133.5 g. of chromium chloride hexahydrate and the equivalent molar quantity of basic chromium chloride, 88.5 g. in 173 g. of methyl alcohol were added and the solution heated to 50° C. for two hours. The salt was removed by filtration and washed with methyl alcohol. 840 g. reaction product were obtained, calculated to contain 40.5% of the Werner chrome complex, of the following formula:

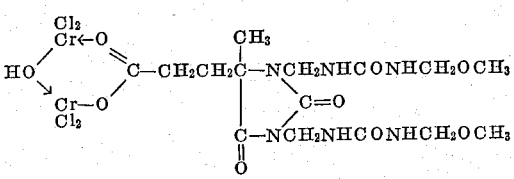

The alcohol solution of this bis-(methoxymethyl-ureidomethyl) derivative of LH chrome complex was miscible with water and alcohol, but not miscible with benzene and carbon tetrachloride. The dried product was soluble in hot water and insoluble in hot ethanol.

EXAMPLE 6

*Waterproofing of film*

To evaluate the water insolubilizing action of chrome complexes on polyhydroxy type polymers, alcoholic solutions of Werner chrome complexes were first combined to form transparent green solutions with 10% polyvinyl alcohol Elvanol 50–42 and poured into 3½" diameter Petri dishes in water. The alcohol and water were removed by evaporation first at room temperature for 2½ days and then at 62° C. for 2 days. These films were stripped off the glass and were compared with a polyvinyl alcohol film (cast in the same manner free of chrome complexes). Small pieces of the films were placed in test tubes filled with hot water for 2 hours at a water bath temperature of 100° C.

COMPARISON OF THE FILMS (1) 40 grams of Elvanol 50–42 (10% solution) in water: This clear transparent film was stripped with difficulty from the Petri dish and dissolved readily in boiling water.
(2) 40 grams of Elvanol 50–42 (10% solution) in water and 10 grams of the LH chrome complex (22.6% in ethyl alcohol): The green transparent film was stripped readily from the Petri dish and did not dissolve in boiling water.
(3) 40 grams of Elvanol 50–42 and 10 grams of N,N'-bis-(methoxymethyl)LH (25.5% in alcohol): The green transparent film was readily stripped from the Petri dish and did not dissolve in boiling water.

EXAMPLE 7

*Tanning of skins*

Pieces of pickled goatskin (spot pH 3) were tanned 1½ hours with 5% solids of the chrome complex of LH in 200% tanning liquor with 10% salt (all percentages were based on the drained weight of the pickled skin). The tannages were buffered with 1⅓% sodium acetate and neutralized with a total of 1½% of sodium bicarbonate. The pieces were washed and fat-liquored, then hung to dry, *wet back*, staked and tacked. Excellent tanning was produced as noted by visual observation and by the shrinkage temperature of the leather Ts, ° C.

|  | Chrome Complexes of— | |
| --- | --- | --- |
|  | LH | Bis(methoxymethyl) derivative of LH |
| pH end of neutralization | 3.8 | 3.95 |
| Ts, ° C. end of neutralization | 89 | 88 |

EXAMPLE 8

To evaluate the effect of the chrome complex of LH on polyvinyl acetate films, the polyvinyl acetate dispersion (Elvacet 1440, 55% solids) was combined with the chrome complexes and compared with Elvacet 1440 alone. Films were cast on clean glass in 3″ to 4″ circles.

|  | 1 | 2 | 3 |
|---|---|---|---|
| Elvacet 1440 (g.) | 45 | 45 | 45 |
| Chrome complex of LH (g.) |  | 1.1 | 2.2 |

All films were dried by exposure to room conditions overnight, heating 2 hours at 50° C. and 3 hours at 80° C. and then cooled slowly to room temperature. After conditioning at 75° F., 65% R.H. for 24 hours, the adhesion was tested by prying the films off the glass with a sharp edge. The films cast with the chrome complexes adhered to the glass markedly more strongly than did Elvacet 1440 alone.

The films on glass were soaked overnight in water at room temperature. All films were easily removed from the glass. However, the cohesion of the films cast with the chrome complexes was much better than the "cheesy" Elvacet 1440 film.

What is claimed is:
1. A compound of the formula

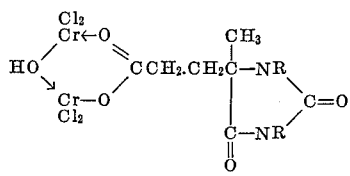

where R stands for H, —CH$_2$OH, —CH$_2$OCH$_3$, —CH$_2$OC$_2$H$_5$, —CH$_2$OC$_3$H$_7$ and —CH$_2$OC$_4$H$_9$, and for —C$_n$H$_{2n+1}$; and wherein $n$ represents an integer from 1 to 4.

2. A process for preparing a compound consisting of a Werner chrome complex of levulinic hydantoin of the formula

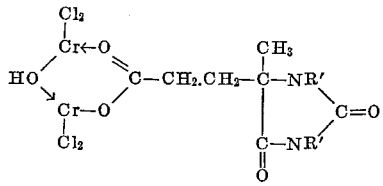

wherein R′ stands for —CH$_2$OCH$_3$, —CH$_2$OC$_2$H$_5$, —CH$_2$OC$_3$H$_7$, and —CH$_2$OC$_4$H$_9$, which comprises reacting a solution of chromium chloride hexahydrate in equimolar amount with levulinic hydantoin at elevated temperature for several hours, filtering the solution to remove insoluble matter, adding to the filtrate an alkoxylating agent of formaldehyde and an alkanol of 1–4 carbon atoms, heating to reflux temperature of the solvent, for more hours, isolating the reaction product by evaporation of the solvent, and drying.

3. A process for preparing a compound consisting of a Werner chrome complex of levulinic hydantoin of the formula

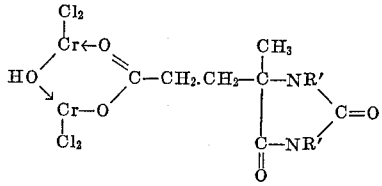

wherein R′ stands for —CH$_2$OCH$_3$, —CH$_2$OC$_2$H$_5$, —CH$_2$OC$_3$H$_7$ and —CH$_2$OC$_4$H$_9$, which comprises reacting levulinic hydantoin with an alkoxylating agent of formaldehyde and an alkanol of 1–4 carbon atoms in solution, adding thereto an equivalent amount of chromium chloride hexahydrate and heating the mixture to boiling temperature of the solvent for several hours, isolating the reaction product by evaporation of the solvent, and drying.

4. A process for preparing a condensation product of a Werner chrome complex of levulinic hydantoin with formaldehyde which comprises first preparing the Werner chrome complex of levulinic hydantoin in alcoholic solution at elevated temperature, evaporating the alcohol, thereafter reacting it with formaldehyde in the proportion of 1 mol:2 mols at slightly elevated temperature for about one hour and drying the product so obtained.

References Cited by the Examiner

UNITED STATES PATENTS

| 2,016,559 | 10/1935 | Reiman et al. | 8—94.27 |
| 2,110,961 | 3/1938 | Merritt | 8—94.27 |
| 2,405,977 | 8/1946 | Peters | 18—57 |
| 2,418,528 | 4/1947 | Robinson et al. | 260—438 |
| 2,510,966 | 6/1950 | Flanagan | 18—57 |
| 2,704,761 | 3/1955 | D'Amico | 260—299 |
| 2,837,528 | 6/1958 | Pugin et al. | 260—299 |
| 2,953,479 | 9/1960 | Heyden et al. | 260—438 |
| 2,985,541 | 5/1961 | Gagliardi et al. | 260—299 |

NICHOLAS S. RIZZO, *Primary Examiner.*

RICHARD D. NEVIUS, JOHN D. RANDOLPH,
*Examiners.*